United States Patent Office 3,843,552
Patented Oct. 22, 1974

3,843,552
CATALYST FOR OXIDATION OF o-XYLENE
Marcel Jouy, Saint Cyrl Ecole, and Michel Coblentz, Chauny, France, assignors to Produits Chimiques Pechiney-Saint-Gobain, Neuilly-sur-Seine, France
No Drawing. Filed Aug. 24, 1971, Ser. No. 174,502
Claims priority, application France, Aug. 26, 1970, 7031182; July 19, 1971, 7126273
Int. Cl. B01j 11/40, 11/82
U.S. Cl. 252—432                                16 Claims

ABSTRACT OF THE DISCLOSURE

This invention is addressed to a catalyst for use in the oxidation of o-xylene to phthalic anhydride and a method for preparing the catalyst and a method for using the catalyst in the oxidation of o-xylene to phthalic anhydride in which the catalyst comprises a support impregnated with a silicate enamel, which is coated with a catalytically active material on the enamelled support.

---

Various organic compounds are produced on an industrial scale by catalytic oxidation, in the presence of air or other oxidizing gases, of another organic compound in its gaseous phase. Phthalic anhydride is, for instance, obtained in this way by oxidation of naphthalene or ortho-xylene, maleic anhydride by oxidation of benzene and pyromellitic anhydride by oxidation of tetrasubstituted benzene hydrocarbons.

Such gaseous phase catalytic oxidation processes can be carried out in an economical manner with catalysts arranged in firm beds or in fluidized beds.

The use of a fluidized bed of catalyst involves technical difficulties which, in general, are difficult to overcome satisfactorily. The yield of phthalic anhydride by the oxidation of o-xylene, using a fluidized bed of catalyst for instance, is insufficient to render the process economically feasible, and for this reason oxidation of o-xylene is very frequently effected with a fixed bed of catalyst arranged in a tubular reactor.

Two principal gaseous phase oxidizing processes are known and are distinguished by their reaction temperatures, oxidation at high temperature and oxidation at low temperature. Oxidation at high temperature is carried out at approximately 450 to 500° C. The advantages of this process are high reaction speed and a good yield whereas its disadvantages are low output and the comparatively short life of the catalyst. Oxidation at low temperature is carried out at about 360° C. to 380° C. The advantages of this process are the long life of the catalyst and good yields but the specific yields only attain approximately 10 to 20% of the yields obtained by the high temperature process.

Various catalysts are known for the preparation of phthalic anhydride by oxidation of o-xylene in the vapor phase at temperatures exceeding 300° C. with gases containing molecular oxygen. It has been known for a long time that a catalyst consisting principally of an oxide of a metal from the Groups V and VI, and particularly Vb and VIb, of the periodic table or a mixture of such oxides can be used. Only catalysts containing vanadium oxide and possibly molybdenum or tungsten oxides have been used in practice. It is known also that a mixture of chromium oxide and vanadium oxide on a support of aluminum oxide or silica gel can be used.

A large number of catalysts for the oxidation of aromatic hydrocarbons or unsaturated hydrocarbon carboxylic acids have also already been suggested. Nearly all these catalysts contain a vanadium compound as an active element as well as activating additions, for example, metal oxides such as oxides of zinc, cerium, titanium, boron, zirconium, bismuth, tungsten, lead and cobalt or, for example, compounds of silver, copper, nickel, and phosphorus. As far as the oxidation of ortho-xylene to phthalic anhydride is concerned, the most usual combination in industry is vanadium oxide and titanium oxide with, possibly, compounds of alkali metals and alkaline earth metals.

However, none of these catalysts are entirely satisfactory for industrial application of oxidation of o-xylene. Sometimes the catalyst is not sufficiently active, sometimes it is not sufficiently selective, and sometimes it only functions correctly for those air/o-xylene ratios which are not economic.

It is accordingly an object of the present invention to provide a catalyst for use in the oxidation of o-xylene to phthalic anhydride which overcomes the foregoing disadvantages, and it is a more specific object of the invention to produce and provide a method for producing a catalyst for use in the oxidation of o-xylene to phthalic anhydride having improved activity and selectivity, which can be used in fluidized form and which is capable of use with varying ratios of an oxygen-containing gas to o-xylene.

It is another object of this invention to provide an improved process for the gas-phase oxidation of o-xylene using the catalyst of this invention to provide phthalic anhydride an improved yield and selectivity.

The concepts of the present invention reside in a catalyst for the preparation of phthalic anhydride by oxidation of ortho-xylene in the gaseous phase comprising a support impregnated with a silicate enamel and a coating of catalytically active material on the enamelled support.

The preferred catalytically active material is a mixture of titanium oxide and vanadium oxide, but this material may contain other oxides or metal compounds previously mentioned as oxidation catalysts or activating additions.

The word "enamel" is used in this specification to mean substances comprising mixtures of oxide which are used to obtain a vitrifiable coating on various materials such as metals and ceramics. Thus, enamel has the meaning generally used in the glass industry and covers "enamels, glazes, glazes used for under-glaze painting, and slags," the latter terms conveying only differences with regard to their use or their method of preparation or manufacture. To conform further with the general custom in the glass industry the quantities of the ingredients of the enamels are expressed in this specification in percentages by weight and the ingredients are in the form of oxides. A softening point and firing or usable temperature range are generally indicated for these enamels.

Good results have been obtained with silicate enamels having a fusion temperature ranging from 600° C. to 1,200° C.

One enamel which may be used is a boro-silicate enamel. The weights of the ingredients which can be used to form the enamels may vary between very large limits, for example, from 20% to 60% of $SiO_2$, from 3 to 15% $Al_2O_3$, from 0.5 to 16% CaO, from 1 to 15% $K_2O+NaO_2$, and from 2 to 40% $BO_{23}$ for the principal ingredients. Excellent results have been obtained as far as output and selectivity is concerned with catalysts prepared using enamels containing from 30% to 60% SiO, from 3% to 15% $Al_2O_3$ from 1% to 15% of one or more alkali metal oxides (e.g., $K_2O+Na_2O$), from 5 to 19% of one or more of alkaline early metal oxides (CaO, BaO, and MgO) and from 20% to 40% $B_2O_3$. It is also possible to use successfully an enamel containing from 20% to 40% $Cio_2$, from 3% to 10% $Al_2O_3$, from 0 to 6% $K_2O+Na_2O$, from 1% to 5% $B_2O_3$, from 1 to 5% ZnO and more than 45% PbO.

The invention also extends to a process for the preparation of a catalyst according to the invention; this process comprises forming a support, impregnating the support with a silicate enamel and coating the enamelled support with a catalytically active material.

The support may be ground electro-fused alumina, such as corundum, which is submitted to an enamelling process and then provided with a coating of catalytically active material.

Alternatively, the support may be formed by a casting or agglomeration process to obtain substantially spherical balls and then enamel is applied to the balls, which are then fired or calcined approximately to the "fusion" temperature of the enamel; the balls are then coated with catalytically active material. (The fusion temperature of the enamel is to be understood as the temperature at which the softened enamel is of sufficiently low viscosity as to spread out. This temperature is within the firing range.)

The balls or agglomerates may be obtained by firing or calcining fine particles of refractory materials, alumina, clay, mixed oxides such as silica-alumina, silica-magnesia, or the base ingredients of refractory materials.

The firing or calcining may, if desired, be carried out using, as a binding material, the same enamel as is subsequently to be applied or another type of enamel or, preferably, a cement with a higher firing or calcining range than that of the enamel subsequently to be applied.

The invention also extends to a process for the oxidation of ortho-xylene in the gaseous phase using a catalyst according to the invention, the process being carried out at a temperature ranging from 360° C. to 445° C. and with an air/o-xylene molar ratio ranging from 69 to 130. An advantage of this process is that it can be operated at air/o-xylene molar ratios as low as 69 without any reduction in output of phthalic anhydride and without any reduction of the selectivity of the reaction (ratio of phthalic anhydride (PA) to o-xylene (OX) which is consumed).

It will be understood that any support which may be suitable for use in the present invention may be used.

For test purposes supports having the following properties have been used.

*Quality A*.—Macroporous alumina was obtained by submitting electro-fused alumina to a crushing and subsequent agglomeration process using cement as binding material. The balls or agglomerates obtained had a diameter ranging from 3 to 8 mm., an intergranular porosity of 25 ml./100 g., an average pore diameter ranging from 80 to 100/$\mu$, and a specific surface ranging from 0.2 to 0.3 m.$^2$/g.

*Quality B*.—Microporous balls or agglomerates. These balls were obtained by agglomeration of fine $\alpha$ alumina particles, followed by sintering at high temperature (1700° C.). The balls had a diameter ranging from 3 to 8 mm., an internal porosity ranging from 2 to 5 ml./100 g. and a specific surface of about 0.1 m.$^2$/g.

*Quality C*.—Grains of corundum spar, crushed electro-fused alumina. These grains had a diameter ranging from 3 to 8 mm., a porosity of 0.02 ml./100 g., and a specific surface below 0.05 m.$^2$/g.

Having described the basic concepts of the invention, reference is now made to the following examples, which are provided by way of illustration and not by way of limitation, of the practice of the invention in the preparation of the catalyst of the invention and the use of the catalyst in the oxidation of o-xylene to phthalic anhydride.

EXAMPLE 1

This example is given as a reference using a support of "Quality A." It is given to illustrate the preparation of the catalytically active material and its deposit on the support. The invention does not depend on the catalytically active material deposited on the support; the example is provided for purposes of comparison, and to demonstrate the manner in which the catalytically active material is prepared and deposited in the support.

The catalytically active material was prepared in the following manner:

16 g. of ammonium hexavanadate and 50 cm.$^3$ of water were poured into a vessel and stirred at 35° C. 10 g. of urea dissolved in 50 cm.$^3$ of water was then added. 75 g. anatase titanium oxide of 7.5 m.$^2$/g., in suspension in water containing 1 cm.$^3$ monoethanolamine, was poured into the vessel and the stirring continued.

One litre of support material "Quality A" was put into a revolving drum and the prepared catalytically active material suspension was poured onto the support material. Drying of the resulting mass was effected by an apiradiator and the dried mass was calcined in a confined atmosphere at 430° C. for 2 hours. Ball-like agglomerates were obtained and on examination of a ball section with binocular magnifying glass, it was seen that the catalytically active material had penetrated to the interior of the ball.

350 ml. of this catalyst was placed in a reaction tube 150 cm. long and 21 mm. inner diameter; the temperature of the tube was regulated by means of a stirred bath of molten salts. The specific flow of ortho-xylene was 160 g. per hour per litre of catalyst and at the air/ortho-xylene molar ratio of 120. The unstable output at the beginning of the operation dropped continuously under these conditions, and, at the end of three days, an output of 64.8% molar of phthalic anhydride (PA) was obtained. The salt bath temperature was 411° C. and the temperature of the hottest point of the bed of catalyst was 480° C.

EXAMPLE 2

This example is provided for purposes of comparison, using a support of "Quality C."

The same catalytically active material as in Example 1 was prepared, and one litre of crush electrofused $\alpha$ alumina of "Quality C" having a grain size of 3–4 mm. was coated with it, using, as before, a revolving drum.

The resulting catalyst was tested as in Example 1 and a stable output of 75.5% molar of PA was obtained.

EXAMPLE 3

This example demonstrates the use of a silicate enamel in accordance with the practice of this invention.

The enamel used in the preparation of the catalyst of this example was an enamel powder of commercial quality of the following percentage composition: $SiO_2$ 47%; $Al_2O_3$ 12.3%; CaO 14%; $K_2O$ 2.3%; $Na_2O$ 0.7%; $B_2O_3$ 27%; softening point 688° C.; firing range 920–1100° C.

(a) 1 litre of macroporous support of "Quality A" was placed in a revolving drum. 80 g. of the boron silicate enamel powder, suspended in water, was added. The impregnated support was dried, put into an oven maintained at 960° C. and left for several hours.

The resulting enamelled support was coated with the same catalytically active material in the same way as described in Example 1.

Examination of a section of a catalyst grain with a binocular magnifying glass showed that the active material had penetrated to the inside of the grains or balls.

On testing the catalyst as described in Example 1 a stable output of 69.5% molar of PA was obtained for a specific flow of OX of 130 g./h./litre and an air/OX ratio of 120. The bath temperature was 432° C. and the hottest point of the catalyst bed was 494° C.

(b) 1 litre of the same support was enamelled with 250 g. of boron silicate enamel as just described and then coated with the same catalytically active material as in Example 1.

Examination of a section of a catalyst grain with a binocular magnifying glass showed that the internal pores had been filed by the enamel.

On testing the catalyst as previously described, there was obtained, on stabilization, a PA output of 79.2% molar and a maleic anhydride (MA) output of 4.8% molar for a supecific flow of OX of 160 g./h./litre and an air/OX ratio of 120. The temperatures of the bath and of the hottest point of the catalyst bed were 372 and 480° C. respectively. For a specific flow of OX of 200 g./h./litre, the output of PA was 79.4 and of maleic anhydride (MA) 4.9, the corresponding temperatures of the bath and catalyst were 374° C. and 486° C.

EXAMPLE 4

One litre of microporous support "Quality B" having a grain size of 4–5 mm. having a porosity of 4 cm.$^3$/100 g. was used. The support was impregnated, in a revolving drum, with 60 g. of the same enamel powder as in Example 3.

After calcination the enamelled support was coated with an active material prepared from 75 g. anatase titanium oxide and 16 g. ammonium hexavanadate.

The catalyst was tested as previously described, and ratio of 120:

| Specific flow | Temperatures (° C.) Bath | Catalyst bed (maximum) | Output percent PA molar | Weight | MA molar |
|---|---|---|---|---|---|
| 160 g./h./litre | 423 | 478 | 82 | 114.3 | 5.2 |
| 200 g./h./litre | 400 | 468 | 81.6 | 113.7 | 5.7 |

EXAMPLE 5

One litre of crushed electro-fused alumina "Quality C" with a grain size of 3–4 mm. was used as a support. The enamelling of the support was carried out as previously described, using 60 g. of the enamel powder of Example 3.

The enamelled support was coated with a catalytically active material and the resulting catalyst tested as described in Example 2. A PA output of 80.50% molar (111.3% weight) was obtained.

After stabilization of the catalyst the value of the ratio air/o-xylene was progressively reduced to a fixed value of 80. A PA output of 80.3% molar was obtained under these conditions.

EXAMPLE 6

A series of tests were carried out using different enamels having the following compositions by weight (the numbers in brackets correspond to the composition in moles):

*Enamel I.*—SiO$_2$ 36.8% (10 moles); Al$_2$O$_3$ 10.4% (1.55 moles); Na$_2$O 2.8% (0.75 mole); K$_2$O 3.2% (0.38 mole); B$_2$O$_3$ 37.2% (8.5 moles); CaO 11.0% (3.2 moles); softening point 688°, firing range 900–1000° C.

*Enamel II.*—SiO$_2$ 44.0% (10 moles); Al$_2$O$_3$ 13.9% (1.88 moles); Na$_2$O+K$_2$O 4.4% (0.82 mole); B$_2$O$_3$ 23.0% (4.5 moles); CaO 15.4% (3.78 moles).

*Enamel III.*—SiO$_2$ 49.9% (10 moles); Al$_2$O$_3$ 7.70% (0.90 mole); Na$_2$O 1.3% (0.25 mole); K$_2$O 0.4% (0.05 mole); B$_2$O$_3$ 29.3% (5.03 moles); CaO 11.5% (3.78 moles); softening point 595° C.

*Enamel IV.*— SiO$_2$ 30.4% (10 moles); Al$_2$O$_3$ 4.3% (0.83 mole); B$_2$O$_3$ 2.9% (0.833 mole); CaO 0.8% (0.28 mole); ZnO 3.5% (0.833 mole); PbO 55.0% (4.86 moles); TiO$_2$ 3.1% (0.72 mole).

*Enamel V.*—SiO$_2$ 47.7% (10 moles); Al$_2$O$_3$ 6.7% (0.83 mole); Na$_2$O+K$_2$0 9.3% (1.49 moles); B$_2$O$_3$ 21% (3.84 moles); CaO 9.9% (2.2 moles); BaO 5.2% (0.43 mole); MgO 0.1% (0.023 mole).

*Enamel VI.*—SiO$_2$ 48.9% (10 moles); Al$_2$O$_3$ 3.0% (0.36 mole); Na$_2$O 14.2% (2.89 moles); K$_2$O 0.7% (0.09 mole); B$_2$O$_3$ 23.9% (4.22 moles); CaO 4.2% (0.93 mole); BaO 2.3% (0.18 mole); ZnO 2.4% (0.36 mole).

*Enamel VII.*—SiO$_2$ 48.2% (10 moles); Al$_2$O$_3$ 10.7% (1.30 moles); Na$_2$O 5, 7% (1.13 moles); B$_2$O$_3$ 17.1% (4.22 moles); CaO 12.4% (2.74 moles): BaO 5.9% (0.48 mole).

The tests previously described were repeated using catalysts incorporating these enamels. The enamels were applied at the rate of 150 g./l. on balls or agglomerates of Quality A which were then calcined at 960° for 2 hours. The catalytically active material was coated onto the enamelled balls as previously described and the resulting catalyst was used working with an air/o-xylene ratio of 120. The details and results are shown in the following table.

| Enamel No. | Specific flow, g. OX/h./l. of catalyst | Temperature, ° C. | OX[1] residual in moles percent | PA[2] Percent weight | PA[2] Percent molar | MA,[3] Percent molar | Combustion, Percent molar | Selectivity[4] percent |
|---|---|---|---|---|---|---|---|---|
| I | 200 | 374–486 | 0.4 | 110.5 | 79.4 | 4.9 | 13.8 | 81 |
| II | 200 | 397–472 | 0.39 | 111.9 | 80.2 | 5.5 | 13.4 | 80.7 |
| III | 200 | 416–437 | 0.42 | 106.8 | 76.6 | 7.2 | 14.5 | 78 |
| IV | 200 | 403–463 | 0.35 | 110.5 | 79.2 | 5.8 | 14 | 79.8 |
| V | 200 | 390–475 | 0.36 | 107.4 | 77.0 | 6.15 | 15 | 77.8 |
| VI | 200 | 393–471 | 0.42 | 105.7 | 75.8 | 8 | 15.2 | 76.3 |
| VII | 200 | 373–448 | 0.25 | 102.3 | 73.3 | 5.65 | 19.9 | 74 |

[1] OX=o-Xylene.
[2] PA=phthalic anhydride.
[3] MA=maleic anhydride.
[4] Selectivity: ratio in moles of phthalic anhydride to the consumed o-xylene.

From the preceding table it can be seen that the catalysts in accordance with the invention produce excellent results from the point of view of output and selectivity.

EXAMPLE 7

This example illustrates the behavior of a catalyst according to the invention in relation to the air/o-xylene ratio. The catalyst was prepared in the following manner. The support was prepared by first agglomerating granulated α corundum with the help of a refractory cement. The balls or agglomerates formed were calcined at 1300° C. The support was subsequently enamelled with the enamel of Example 3 at less than 0.2 m.$^2$/g. of surface allowing a residual porous volume of 5 ml./100 g. at the rate of 125 g./l.

One litre of this enamelled support was then coated with 15 g. ammonium hexavanadate and 67.5 g. anatase titanium oxide as previously described.

The resulting catalyst was placed in a catalysis tube 2 m. long and 21 mm. in diameter. The tube was heated in a stirred molten salt bath.

After stabilization at a flow of 200 g. o-xylene/h./litre of catalyst the results set out in the following table were obtained.

| Air/o-xylene ratio | | Temperature— hottest point | | PA output (condensation) | |
|---|---|---|---|---|---|
| Weight | Molar | Bath | Catalyst (maximum) | Bed molar | Weight |
| 32 | 117 | 389 | 448 | 77.8 | 108.5 |
| 28 | 102 | 386 | 441 | 77.4 | 108 |
| 25 | 91 | 381 | 441 | 77.4 | 108 |
| 23 | 84 | 378 | 442 | 76.7 | 107 |
| 21 | 76.5 | 378 | 441 | 77.4 | 108 |
| 20 | 73 | 378 | 448 | 77.0 | 107.5 |
| 19 | 69 | 378 | 450 | 77.4 | 108 |

For comparison the following table shows the results obtained using a non-enamelled catalyst but which, in other respects, was prepared in identical manner as that just described.

| Air/o-xylene ratio | | Temperature | | PA output | |
|---|---|---|---|---|---|
| Weight | Molar | Bath | Catalyst (maximum) | Molar | Weight |
| 31.5 | 116 | 378 | 447 | 75.3 | 105 |
| 28 | 102 | 377 | 445 | 74.9 | 104.5 |
| 25 | 91 | 378 | 448 | 75.3 | 105 |
| 24 | 87 | 377 | 453 | 74.2 | 103.5 |
| 23 | 85 | 378 | 450 | 73.8 | 103 |
| 23 | 84 | 380 | 451 | 73.5 | 102.5 |
| (1) | 117 | 382 | 441 | 73.8 | 103 |

[1] Return at 32.

It can be seen that the non-enamelled catalysts are not as good as the enamelled catalysts according to the invention, and that the qualities deteriorate regularly as the air/o-xylene ratio falls below 90.

EXAMPLE 8

To show the advantages of the present process, the following figures are given to illustrate the advantages obtainable by working with a low air/o-xylene ratio. The gain enters essentially out of the compression energy. The figures include the values of the charge losses and of the energy used for the production of one ton of PA for three air/o-xylene weight ratios: 30, 22 and 19 (molar ratios 109, 80, and 69).

An oxidation output of the order of 80% molar has been adopted as basis. Under these conditions, taking into account an o-xylene purity of 98% and a distillation output also of 98%, a quantity of 940 kg. of o-xylene per ton of distilled PA is required.

As far as the charge losses of the catalytic bed are concerned, 0.3 bar were added to this to take into account the losses caused by the apparatus used for measuring output, preheating and air-mixing upstream, cooling, and purification downstream.

These facts were used for the calculation of the energy for an adiabatic compression and for the real energy, expressed in Kwh. per ton of PA, taking into account an output of 75% for the compressor and of 95% for the motor.

The following results were obtained.

| | Air/OX ratio, weight | | |
|---|---|---|---|
| | 30 | 22 | 19 |
| Molar | (109) | (80) | (69) |
| Air consumed (K moles/t. PA) | 972 | 713 | 615 |
| Catalyst charge loss (kg./cm.²) | 0.61 | 0.37 | 0.29 |
| Active delivery pressure (kg./cm.²) | 0.91 | 0.67 | 0.59 |
| Adiabatic compression energy (Kwh./t. PA) | 500 | 268 | 207 |
| Real compression energy (Kwh./t. PA) | 701 | 376 | 291 |

The above examples clearly illustrate the advantages and the technical progress brought about by the present invention. It can be seen that with the catalysts according to the invention, it is possible:

to work in a range of temperatures intermediate the high and low temperature processes.

to obtain better ouputs and a better selectivity than with high temperature processes or even with low temperature processes.

an essential supplementary advantage resides in the fact that the present process permits working with low air/o-xylene molar ratios, for example 69–80, which appears as a gain of energy, for using as a gain in the condensation of the phthalic anhydride;

the invention consequently allows a better optimization of the oxidation operation.

the process according to the invention makes it possible to improve the outputs of phthalic anhyldride on different supports and with compositions which have different proportions of catalytically active material. It is evident that the most spectacular improvements will be obtained in those cases where the previous outputs had been comparatively low. On comparing for instance Examples 1 and 3, it will be seen that the output value of 64.8% can be raised to 79.4%, whereas on comparison of Examples 2 and 5, it will be seen that the output of 75.5 is raised to 80.5%.

It will be apparent that various changes and modifications can be made in the details of formulation, procedure, and use without departing from the spirit of the invention, especially as defined in the following claims.

We claim:

1. A catalyst for the preparation of phthalic anhydride by oxidation of ortho-xylene in the gaseous phase comprising a support impregnated with a silcate enamel and a coating of catalytically active material on the enamelled support.

2. A catalyst according to claim 1, in which the catalytically active material comprises titanium oxide and vanadium oxide.

3. A catalyst according to claim 1, in which the catalytically active material includes at least one oxide selected from the oxides of metals of Groups V and VI of the Periodic Table.

4. A catalyst according to claim 1, in which the support is in the form of particles of ground electro-fused alumina.

5. A catalyst according to claim 1, in which the support is in the form of balls obtained by sintering fine particles of materials selected from the group consisting of refractory materials, refractory oxides and mixed oxides capable of forming refractory materials.

6. A catalyst according to claim 4, in which the sintered material contains a binder material having a fusion temperature higher than that of the impregnating enamel, the binder material being selected from enamels and cements.

7. A catalyst according to claim 1, in which the enamel has a fusion temperature ranging from 800° C. to 1,200° C.

8. A catalyst accordinng to claim 1, in which the enamel is a boro-silicate enamel containing, by weight, from 20% to 60% $SiO_2$, from 3 to 15% $Al_2O_3$, from 0.5 to 16% CaO, from 1% to 15% $K_2O$ plus $Na_2O$ and from 2% to 40% $B_2O_3$.

9. A catalyst according to claim 1, in which the enamel contains, by weight, from 30% to 60% $SiO_2$, from 3% to 15% $Al_2O_3$, from 1% to 15% $K_2O$ plus $Na_2O$, from 5% to 19% of a mixture of alkaline earth metal oxides and from 20% to 40% $B_2O_3$.

10. A catalyst according to claim 1, in which the enamel contains from 20% to 40% $SiO_2$, from 3% to 10% $Al_2O_3$, from 0% to 6% $K_2O$ plus $Na_2O$, from 1% to 5% $B_2O_3$, from 1% to 5% ZnO and more than 45% PbO.

11. A catalyst for the preparation of phthalic anhydride by oxidation of ortho-xylene in the gaseous phase comprising a support selected from the group consisting of refractory materials and mixed oxides capable of forming refractory materials, a coating on the support, said coating comprising a vitrified silicate enamel having a fusion temperature from 800° C. to 1200° C. and a catalytically active material comprising at least one oxide selected from the group consisting of oxides of Group V and VI metals.

12. A catalyst accordinng to claim 11, in which the catalytically active material comprises titanium oxide and vanadium oxide.

13. A catalyst according to claim 11, in which the support is in the form of particles of ground electro-fused alumina.

14. A catalyst according to claim 11, in which the enamel is a boro-silicate enamel containing, by weight, from 20% to 60% $SiO_2$, from 3 to 15% $Al_2O_3$, from 0.5 to 16% CaO, from 1% to 15% $K_2O$ plus $Na_2O$ and from 2% to 40% $B_2O_3$.

15. A catalyst according to claim 11, in which the enamel contains, by weight, from 30% to 60% $SiO_2$, from 3% to 15% $Al_2O_3$, from 1% to 15% $K_2O$ plus $Na_2O$, from 5% to 19% of a mixture of alkaline earth metal oxides of CaO, BaO and MgO and from 20% to 40% $B_2O_3$.

16. A catalyst according to claim 11, in which the enamel contains from 20% to 40% $SiO_2$ from 3% to 10% $Al_2O_3$, from 0% to 6% $K_2O$ plus $Na_2O$, from 1% to 5% $B_2O_3$, from 1% to 5% ZnO and more than 45% PbO.

References Cited
UNITED STATES PATENTS

| | | | |
|---|---|---|---|
| 3,177,229 | 4/1965 | Leak ea al. | 260—346.4 |
| 3,509,179 | 4/1970 | Friedrichsen et al. | 260—346.4 |
| 3,030,314 | 4/1962 | Knowlton et al. | 252—432 |
| 2,863,838 | 12/1958 | Vincent | 252—432 |

CARL F. DEES, Primary Examiner

U.S. Cl. X.R.

252—455 R, 456, 477 R

UNITED STATES PATENT OFFICE
CERTIFICATE OF CORRECTION

Patent No. 3,843,552            Dated October 22, 1974

Inventor(s) Marcel Jouy and Michel Coblentz

It is certified that error appears in the above-identified patent and that said Letters Patent are hereby corrected as shown below:

In column 1, line 8, please change "7126273"

to -- 7126278 --.

Signed and Sealed this nineteenth Day of August 1975

[SEAL]

Attest:

RUTH C. MASON
Attesting Officer

C. MARSHALL DANN
Commissioner of Patents and Trademarks